United States Patent Office 3,475,350
Patented Oct. 28, 1969

3,475,350
AMMOXIDATION CATALYST
Charles N. Winnick, Teaneck, N.J., and Anthony N. Naglieri, New York, N.Y., assignors to Halcon International, Inc., a corporation of Delaware
No Drawing. Continuation-in-part of application Ser. No. 390,206, Aug. 17, 1964. This application Mar. 22, 1968, Ser. No. 715,197
Int. Cl. B01j 11/46; C07c 121/04
U.S. Cl. 252—464                                     4 Claims

ABSTRACT OF THE DISCLOSURE

A catalyst consisting of the oxides of antimony and vanadium in an atomic ratio of at least 2.0:1.0, used in the production of aromatic nitriles through ammoxidation of alkyl and alkenyl aromatics.

---

This application is a continuation-in-part of U.S. application 390,206, filed Aug. 17, 1964 now abandoned.

This invention relates to an ammoxidation catalyst used in the production of aromatic nitriles from alkyl and alkenyl aromatic compounds. More specifically this invention relates to an ammoxidation catalyst of antimony and vanadium on a support. Still more specifically this invention relates to a catalyst wherein the atomic ratio of antimony to vanadium is at least 2.0:1.0.

The conversion of alkyl or alkenyl aromatics to aromatics to aromatic nitriles by the simultaneous reaction with ammonia and oxygen has been known since 1950. The reaction is generally performed in the vapor phase in the presence of a catalyst. An example of this ammoxidation is the conversion of paraxylene to terephthalonitrile. This process, while advantageous as contrasted to the two-step route, i.e., the oxidation of the aromatic alkyl and alkenyl to the acid followed by amidation and dehydration of the amide, results in nitrile selectivities of only about 70%.

In accordance with the instant invention, it has been discovered that a co-catalyst comprising antimony and vanadium having an atomic ratio of at least 2.0:1.0 results in selectivities in the above mentioned ammoxidation approaching 80%. This sharp increase in selectivity is particularly surprising especially when contrasted to the results obtained by using a single metal catalyst, other combination of metals, or antimony and vanadium catalysts having atomic ratios of less than 2.0:1.0.

The aromatic compounds suitable for conversion into the nitriles by the co-catalyst system of this invention may be represented by the formula:

where R represents —H or an alkyl or an alkenyl radical, R' and R'' represents —H, —OH or =O or an alkyl or an alkenyl radical, and X represents the unsubstituted phenyl radical or the phenyl radical substituted in any of the 2 to 6 positions by —F, —Cl, —Br, or the radical

or represents the phenyl radical condensed with no more than one benzene ring.

Where in the above formula R, R' and R'' represent hydrogen or an alkyl or an alkenyl radical and X represents the unsubstituted phenyl radical or such radical condensed with no more than one benzene ring, the aromatic compounds are alkyl substituted or alkenyl substituted benzene and naphthalene hydrocarbons. Alcohols, aldehydes or ketones which are intermediate oxidation products of such hydrocarbon contain the oxygen linked directly to acyclic carbon with no oxygen atom being directly linked to more than one of the acyclic carbon atoms and no acyclic carbon atom being directly linked to oxygen by more than two of its valences.

To illustrate the nitrile compounds formed, reference is made to the following table:

TABLE 1

| Alkyl or Alkenyl Aromatic: | Nitrile |
|---|---|
| (1) Toluene | Benzonitrile. |
| (2) Para-xylene | p-Tolunitrile and terephthalonitrile. |
| (3) Meta-xylene | m-Tolunitrile and isophthalonitrile. |
| (4) Ortho-xylene | o-tolunitrile, phthalonitrile and phthalimide. |
| (5) Mesitylene | Trimesic acid trinitrile. |
| (6) Ethylbenzene | Benzonitrile. |
| (7) p-Cymene | p-Tolunitrile, p-isopropyl benzonitrile and terephthalonitrile. |
| (8) Chlorotoluene | Chlorobenzonitrile. |
| (9) Alph-methyl naphtha | Alpha-cyano naphthalene and phthalonitrile. |

The types of compounds which may be used to form the finished catalyst are as follows:

Antimony halides such as antimony trichloride and antimony tribromide and antimony oxides such as antimony trioxide and antimony pentoxide, to supply the antimony component. The antimony compounds may be dissolved with water and concentrated hydrochloric acid.

The vanadium catalyst may be introduced conveniently as vanadium pentoxide and ammonium metavanadate. The vanadium compounds are reduced to V+4 state in water or concentrated hydrochloric acid with oxalic acid or sulphur dioxide to give a homogeneous solution.

The catalyst support is preferably alumina with a surface area of about 0.5 m.²/gm. Other supports such as silicon carbide, pumice and zirconia may be used.

The antimony to vanadium ratio of the catalyst, expressed in terms of atomic ratio must be at least 2.0:1.0; preferably above 3.0:1.0 and especially above 3.8:1.0.

The solution of the metals are mixed and contacted with the support. Thereafter they are dried, preferably in a rotary evaporator, and finally calcined at a temperature from 300 to 550° C.

In performing the reaction the nitrile precursor is intermixed with an oxygen-containing gas and ammonia or a substance yielding ammonia. Most generally, the oxygen-containing gas is air, but, of course, pure oxygen may be employed. As a general rule, it is desirable that the feed contain from 8 to 20% oxygen.

The ammonia level in the feed may range broadly from 2 to 20%, 4 to 8% is preferred. Generally, ammonia is added; however, compounds which yield ammonia under the reaction conditions, e.g., ammonium carbonate, may be substituted.

The amount of the alkyl or alkenyl aromatics compounds may vary over a broad range and depends on the particular compound employed. Generally, less than 10% of the aromatic compound is present, preferably, from 0.5 to 5%.

It is preferable also to carry out the reaction in the presence of steam. Amounts up to 60% are advantageous, but preferably, amounts in the range of from 5 to 25% of the feed gas are used. Steam moderates the reaction thereby decreasing CO and CO₂ make. The reaction conditions are also dependent on the nitrile compounds formed. Consideration of the number of nitriles introduced and volatility of the alkyl or alkenyl feed constituents must be given. Broadly, temperatures are in the range of 200 to 800° C., preferably 325 to 500° C. In the case of the preparation of terephthalonitrile, preferred temperatures are 425 to 600° C.

While atmospheric conditions may be satisfactorily employed, pressures up to 100 atmospheres are suitable. Space velocities of 500 to 4000/hour are satisfactory, preferably 1000 to 2500/hour.

To illustrate more fully the instant invention attention is directed to the following examples:

EXAMPLE 1

The catalyst of the instant invention is prepared by adding 20.8 grams of vanadium pentoxide to 100 cc. of concentrated hydrochloric acid. Sulphur dioxide is bubbled through the solution until it becomes clear blue and homogeneous. A second solution is prepared by dissolving 202 grams of antimony trichloride in 400 cc. of concentrated hydrochloric acid. The two solutions are mixed and added to 1440 grams of Alcoa tabular alumina T-71, ¼" to 8 mesh and dried in a rotary evaporator. The catalyst is calcined by heating to 425° C. in an oven. This temperature is maintained for 2 hours. The finished catalyst contains 1.3 weight percent of vanadium pentoxide and 8.1 weight percent of antimony trioxide on alumina, (equivalent to an atomic ratio of 3.8:1.0). The calcined catalyst is loaded into a jacketed carbon steel tube (1 inch O.D. x 10 feet) to form a 114 inch bed. A gaseous mixture containing 1% para-xylene, 10% steam, 6% ammonia and 83% air, all percent by volume, pass through the carbon steel tube over the catalyst at a space velocity of 1500/hour. The tube is heated to 730° F. by running molten salt in the jacket countercurrently to the feed.

With an essentially complete conversion, a terephthalonitrile yield of 82.5 mole percent is obtained.

EXAMPLE 2

Additional runs using different catalysts are performed to show the outstanding results that are obtained by employing the claimed catalyst. The percentage of catalyst components, the salt temperatures employed and the yield of terephthalonitrile are shown in the following table:

| | $V_2O_5$ | $Sb_2O_3$ | $SnO_2$ | $CrO_3$ | Salt Temp., °C. | Mol Percent TPN |
|---|---|---|---|---|---|---|
| 1 | 4.8 | | | | 432 | 56.4 |
| 2 | 1.3 | | 8.6 | | 400 | 71.4 |
| 3 | 4.4 | | | 9.6 | 399 | 48.9 |
| 4 | | 8.1 | | | 400 | 0 |

In run No. 2 the tin in the catalyst is added as stannous chloride dissolved in water. In run No. 3 the chromium is added as chromiun trioxide dissolved in water.

The above table clearly shows that the vanadium-antimony catalyst described in Example 1 is markedly superior to the other catalysts. The next best catalyst, the vanadium-tin, had a selectivity over 10 points less than that obtained by using the instant invention. Surprisingly, the antimony catalyst is completely ineffective per se yet when combined in proper proportions with the vanadium, also a particularly poor catalyst per se, outstandingly high yields are obtained. The result is particularly surprising and unexpected.

EXAMPLE 3

Additional runs using different atomic ratios of antimony and vanadium are performed to show the outstanding difference obtained at atomic ratios of antimony to vanadium of above 2.0:1.0.

| | Atomic Ratio of Sb/V | Salt Temp., °F. | Mole Percent TPN |
|---|---|---|---|
| 1 | 3.8/1.0 | 730 | 82.5 |
| 2 | 1.3/1.0 | 753 | 61.5 |
| 3 | 1.0/1.9 | 775 | 70.1 |

The above table clearly shows the marked improvement in yield when an atomic ratio greater than 2.0:1.0 is employed.

EXAMPLE 4

Run No. 1 was repeated except meta-xylene was employed as the feed. A yield of isophthalonitrile of 65% was obtained.

What is claimed is:

1. An ammoxidation catalyst which comprises the oxides of antimony and vanadium in an atomic ratio of at least 2.0:1.0, on a support.

2. The catalyst of claim 1 wherein said support is alumina having a surface area of less than 1 m.²/gm.

3. The catalyst of claim 1 wherein the atomic ratio is at least 3.0:1.0.

4. The catalyst of claim 1 wherein the atomic ratio is at least 3.8:1.0.

References Cited

UNITED STATES PATENTS

| 3,313,856 | 4/1967 | Phielix | 260—604 |
| 2,081,272 | 5/1937 | Foster | 23—234 |
| 2,180,353 | 11/1939 | Foster | 23—234 |

DANIEL E. WYMAN, Primary Examiner

P. M. FRENCH, Assistant Examiner

U.S. Cl. X.R.

252—461; 260—465

Disclaimer 3,475,350.—*Charles N. Winnick*, Teaneck, N.J., and *Anthony N. Naglieri*, New York, N.Y AMMOXIDATION CATALYST. Patent dated Oct. 28, 1969. Disclaimer filed Mar. 27, 1972, by the assignee, *Halcon International, Inc.*

Hereby enters this disclaimer to each and every claim of said patent.

[*Official Gazette August 1, 1972.*]